United States Patent
Schuldt et al.

(10) Patent No.: US 11,187,243 B2
(45) Date of Patent: Nov. 30, 2021

(54) DIFFUSOR FOR A RADIAL COMPRESSOR, RADIAL COMPRESSOR AND TURBO ENGINE WITH RADIAL COMPRESSOR

(71) Applicant: Rolls-Royce Deutschland Ltd & Co KG, Blankenfelde-Mahlow (DE)

(72) Inventors: Simon Schuldt, Koenigs Wusterhausen (DE); Knut Rosenau, Herzfelde (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 1247 days.

(21) Appl. No.: 15/288,058

(22) Filed: Oct. 7, 2016

(65) Prior Publication Data

US 2017/0102005 A1   Apr. 13, 2017

(30) Foreign Application Priority Data

Oct. 8, 2015   (DE) ...................... 10 2015 219 556.2

(51) Int. Cl.
| | |
|---|---|
| F04D 29/44 | (2006.01) |
| F02K 3/06 | (2006.01) |
| F04D 17/02 | (2006.01) |
| F02C 3/06 | (2006.01) |
| F02B 33/40 | (2006.01) |
| F04D 17/10 | (2006.01) |

(52) U.S. Cl.
CPC ............ *F04D 29/444* (2013.01); *F02B 33/40* (2013.01); *F02C 3/06* (2013.01); *F02K 3/06* (2013.01); *F04D 17/025* (2013.01); *F04D 17/10* (2013.01); *F05D 2220/3219* (2013.01); *F05D 2240/12* (2013.01)

(58) Field of Classification Search
CPC .... F02B 33/40; F02C 3/06; F02C 3/08; F02K 3/06; F04D 17/025; F04D 17/10; F04D 29/444; F05D 2220/3219; F05D 2240/12
See application file for complete search history.

(56) References Cited

U.S. PATENT DOCUMENTS

| | | |
|---|---|---|
| 2,419,669 A | 4/1947 | Birmann |
| 2,609,141 A | 9/1952 | Aue |
| 2,662,553 A | 12/1953 | Norman |
| 2,967,013 A | 1/1961 | Dallenbach et al. |

(Continued)

FOREIGN PATENT DOCUMENTS

| | | |
|---|---|---|
| CH | 544225 | 11/1973 |
| DE | 202013005212 | 7/2013 |

(Continued)

OTHER PUBLICATIONS

German Search Report dated Sep. 26, 2016 from counterpart German App 102015219556.2.

*Primary Examiner* — Kenneth Bomberg
*Assistant Examiner* — Julian B Getachew
(74) *Attorney, Agent, or Firm* — Timothy J. Klima; Shuttleworth & Ingersoll, P.L.C.

(57) ABSTRACT

A diffuser for a radial compressor of a turbomachine is provided. The diffuser has a plurality of diffuser channels, wherein the diffuser channels extend across a radial area of the diffuser across a bent area into an axial area of the diffuser, wherein, in the radial area of the diffuser, the diffuser channels have diffuser walls in particular at v-shaped blades that are bent in the movement direction of the radial compressor or are straight.

19 Claims, 12 Drawing Sheets

(56) References Cited

U.S. PATENT DOCUMENTS

| | | |
|---|---|---|
| 3,644,055 A | 2/1972 | Davis et al. |
| 3,719,430 A | 3/1973 | Blair et al. |
| 3,860,360 A | 1/1975 | Yu |
| 3,861,826 A | 1/1975 | Dean, Jr. |
| 3,876,328 A | 4/1975 | Exley |
| 3,905,721 A | 9/1975 | Fitzpatrick |
| 3,936,223 A | 2/1976 | Baghdadi |
| 4,027,997 A | 6/1977 | Bryans |
| 4,100,732 A | 7/1978 | Bryans et al. |
| 4,344,737 A | 8/1982 | Liu |
| 4,349,314 A | 9/1982 | Erwin |
| 4,431,374 A | 2/1984 | Benstein et al. |
| 4,576,550 A | 3/1986 | Bryans |
| 4,824,325 A | 4/1989 | Bandukwalla |
| 4,877,373 A | 10/1989 | Bandukwalla |
| 4,938,661 A | 7/1990 | Kobayashi et al. |
| 5,178,516 A | 1/1993 | Nakagawa et al. |
| 5,316,441 A | 5/1994 | Osborne |
| 5,362,203 A | 11/1994 | Brasz |
| 5,529,457 A * | 6/1996 | Terasaki ............... F04D 29/444 415/208.3 |
| 5,564,898 A | 10/1996 | Richards et al. |
| 5,704,211 A | 1/1998 | Hatfield |
| 6,123,506 A | 9/2000 | Brand et al. |
| 6,155,779 A | 12/2000 | Watanabe et al. |
| 6,279,322 B1 | 8/2001 | Moussa |
| 6,442,940 B1 | 9/2002 | Young et al. |
| 6,471,475 B1 | 10/2002 | Sasu et al. |
| 6,540,481 B2 | 4/2003 | Moussa et al. |
| 6,554,569 B2 | 4/2003 | Decker et al. |
| 6,589,015 B1 | 7/2003 | Roberts et al. |
| 6,695,579 B2 | 2/2004 | Meng |
| 6,834,501 B1 | 12/2004 | Vrbas et al. |
| 7,025,566 B2 | 4/2006 | Sasu et al. |
| 7,032,383 B2 | 4/2006 | Weber |
| 7,094,024 B2 | 8/2006 | Nguyen et al. |
| 7,101,151 B2 | 9/2006 | Loringer et al. |
| 7,407,367 B2 | 8/2008 | McAuliffe et al. |
| 7,442,006 B2 | 10/2008 | Nguyen et al. |
| 7,448,852 B2 | 11/2008 | Abdelwahab et al. |
| 7,500,364 B2 | 3/2009 | Schumacher et al. |
| 7,717,672 B2 | 5/2010 | Barton et al. |
| 7,798,777 B2 | 9/2010 | Moussa et al. |
| 7,827,798 B2 | 11/2010 | Commaret et al. |
| 7,862,295 B2 | 1/2011 | Daguenet |
| 7,871,243 B2 | 1/2011 | Chen et al. |
| 7,955,051 B2 | 6/2011 | Daguenet et al. |
| 8,006,497 B2 | 8/2011 | Nolcheff et al. |
| 8,016,557 B2 | 9/2011 | Abdelwahab et al. |
| 8,038,392 B2 | 10/2011 | Honda et al. |
| 8,047,777 B2 | 11/2011 | Commaret et al. |
| 8,087,491 B2 | 1/2012 | Merchant et al. |
| 8,127,551 B2 | 3/2012 | Commaret et al. |
| 8,142,148 B2 | 3/2012 | Hernandez et al. |
| 8,147,186 B2 | 4/2012 | Ibaraki et al. |
| 8,162,604 B2 | 4/2012 | Kuhnel et al. |
| 8,231,341 B2 | 7/2012 | Anderson et al. |
| 8,287,236 B2 | 10/2012 | Nishida et al. |
| 8,425,188 B2 | 4/2013 | Dovbush et al. |
| 8,438,854 B2 | 5/2013 | Nolcheff |
| 8,505,305 B2 | 8/2013 | Ziaei et al. |
| 8,511,981 B2 | 8/2013 | Small et al. |
| 8,540,484 B2 | 9/2013 | Hollman et al. |
| 8,585,348 B2 | 11/2013 | Lin et al. |
| 8,616,841 B2 | 12/2013 | Johnson |
| 8,616,843 B2 | 12/2013 | Shibata et al. |
| 8,839,625 B2 | 9/2014 | Napier et al. |
| 9,291,171 B2 | 3/2016 | Bunel et al. |
| 9,512,733 B2 | 12/2016 | Lombard et al. |
| 9,581,170 B2 | 2/2017 | Holbrook |
| 9,631,814 B1 | 4/2017 | Barton et al. |
| 9,726,032 B2 | 8/2017 | Ress, Jr. et al. |
| 9,874,220 B2 | 1/2018 | Adams |
| 10,208,628 B2 | 2/2019 | Nasir et al. |
| 10,330,121 B2 | 6/2019 | Reynolds et al. |
| 10,352,237 B2 | 7/2019 | Mazur et al. |
| 2005/0163610 A1 | 7/2005 | Higashimori |
| 2007/0183890 A1 | 8/2007 | Nolcheff et al. |
| 2011/0097204 A1* | 4/2011 | Hernandez ............ F04D 29/444 415/207 |
| 2012/0014788 A1* | 1/2012 | Blair .................... F04D 25/163 415/208.2 |
| 2012/0272663 A1 | 11/2012 | Moussa et al. |
| 2014/0150442 A1 | 6/2014 | Negulescu |
| 2016/0003149 A1 | 1/2016 | Suciu et al. |
| 2016/0061212 A1 | 3/2016 | Mokulys et al. |
| 2016/0061219 A1 | 3/2016 | Mokulys et al. |
| 2016/0115971 A1 | 4/2016 | Duong et al. |
| 2017/0102005 A1 | 4/2017 | Schuldt et al. |
| 2017/0248155 A1 | 8/2017 | Parker et al. |
| 2017/0292536 A1 | 10/2017 | Konig |
| 2017/0362947 A1 | 12/2017 | Nasir et al. |
| 2018/0135516 A1 | 5/2018 | Nasir et al. |
| 2018/0216629 A1 | 8/2018 | Benetschik et al. |
| 2018/0258959 A1 | 9/2018 | Honda et al. |
| 2018/0274376 A1 | 9/2018 | King et al. |
| 2019/0162191 A1 | 5/2019 | Lesser et al. |
| 2019/0226493 A1 | 7/2019 | Choi et al. |
| 2019/0264705 A1 | 8/2019 | Higashimori et al. |

FOREIGN PATENT DOCUMENTS

| | | |
|---|---|---|
| EP | 1214522 | 12/2004 |
| FR | 2922939 A1 | 5/2009 |
| FR | 3024887 A1 | 2/2016 |
| GB | 702773 A | 1/1954 |
| WO | WO2013013740 | 1/2013 |
| WO | 2016001364 A1 | 1/2016 |
| WO | 2017129342 A | 8/2017 |
| WO | 2018205631 A1 | 11/2018 |
| WO | 2019063384 A1 | 4/2019 |

* cited by examiner

DIFFUSOR FOR A RADIAL COMPRESSOR, RADIAL COMPRESSOR AND TURBO ENGINE WITH RADIAL COMPRESSOR

REFERENCE TO RELATED APPLICATION

This application claims priority to German Patent Application No. 10 2015 219 556.2 filed on Oct. 8, 2015, the entirety of which is incorporated by reference herein.

BACKGROUND

The invention relates to a diffuser for a radial compressor, a radial compressor and a turbomachine.

Radial compressors are used in turbomachines, for example, in particular also in helicopter and aircraft engines. Here, a radial compressor has an impeller to which a diffuser connects as a guide wheel (i.e., stator). At the exit of the impeller, the outflowing gas has a high absolute velocity, which is transformed inside the diffuser into static pressure by a deceleration of the flowing gas. Here, it is known from the state of the art to provide the diffuser with blades, v-shaped blades or extending pipes that guide the flow in the radial direction and deflect it axially.

SUMMARY

When developing such solutions, it is important to make efficient use of the installation space for the radial compressor.

This objective is achieved through a diffuser for a radial compressor with the features as disclosed herein.

The diffuser has a plurality of diffuser channels that guide the outflowing gas further in the radially outward direction and decelerate it. At that, the diffuser channels extend across a radial area of the diffuser across a bent area into an axial area of the diffuser, wherein, in the radial area of the diffuser, the diffuser channels have diffuser walls—in particular at v-shaped blades—that are either bent in the movement direction of the radial compressor or are straight.

In this way, the gas that is flowing through the diffuser is guided through a radial and an axial area, wherein the bent area forms the transition between these areas.

Due to the design of the diffusion channels, the gas flows inside the exit plane of the radial compressor for a comparatively long time. This is expedient, since an immediate deflection into the axial direction leads to a loss of efficiency. Due to the diffuser channels being bent in the circumferential direction, the length of the diffuser channels remains the same, but the radial installation space is reduced.

Here, the diffuser channels are arranged on a base plate and/or a cover of the diffuser, with the diffuser walls being bent or straight in the circumferential direction of the diffuser. The diffuser walls are in particular arranged at v-shaped blades. Between two blades, i.e., inside the diffuser channels, the flowing gas is guided further outwards in a radially oblique manner, being decelerated in the process. Subsequently, it is axially deflected due to the bent area, and is further decelerated in the axial direction. At that, it can be decelerated in the axial deflection, accelerated, or merely deflected.

In one embodiment, the diffuser channels are laterally delimited by the diffuser walls that extend continuously from the radial area, across the bent area and the axial area. Thus, the flowing gas is continuously guided inside the diffuser channels.

In a further embodiment, the bent area—that is, the area that forms the transition between the radial area and the axial area—has circular or elliptical contour.

In a further design of the diffuser, the length ratio of the flow paths of the diffuser channels in the radial area with respect to the flow paths in the diffuser channels in the axial area is between 1:1 and 4:1, in particular is 3:1. This ratio can be selected according to the respective application case. The higher the ratio, the higher the efficiency, but also the radial installation space.

In one embodiment, an inclination of the diffuser channel in the area of the diffuser exit has an inclination angle of up to 30° in the direction of the rotational axis of the radial compressor; i.e., an inward inclination is present. In this manner, it is for example possible to guide gas, which is exiting the diffuser, in the direction of a combustion chamber of the turbomachine and/or in the direction of fuel nozzles in a targeted manner. Also, a particularly compact design of the turbomachine can be achieved in this way.

In a further design, the entrance angles of the diffuser walls of the diffuser channels, in particular at the diffuser full wedges, are between 15° and 30°, in particular between 18° and 25°, quite in particular 21°, wherein the entrance angle is measured from the tangent T of the impeller.

In another embodiment, the angles of the v-shaped blades are between 4° and 15° at the inner circumference of the diffuser.

Further, the diffuser channels can have an area in which a cross-sectional area that is located downstream of the flow direction is larger perpendicular to the flow direction than a cross-sectional area that is located upstream. In this way, a pressure increase is effected inside the diffuser. In particular, the enlarged cross-sectional areas of the diffuser channels can be formed by areas of the v-shaped blades that taper off in flow direction in the area of the axial outflow. The tapering angle of the v-shaped blades at the exit can in particular be between 8° and 60°.

In one design, the ratio of the cross-sectional area in the radial entry area of the diffuser channels with respect to the cross-sectional area in the axial exit area can be between 1:1.2 and 1:4, in particular it can be 1:2. This means that the cross-sectional areas are further enlarged in the axial area.

Also, the base plate can have a radius of curvature between 5% and 60%, in particular 10% to 40% of the radial installation length of the diffuser in the bent area—that is, at the transition from the radial to the axial area. In this manner, the radial construction size can be influenced.

Also, in a further embodiment, covers of the diffuser channels in the bent area have a radius of curvature of 5% to 120%, in particular of 5% to 60% of the radial installation length (i.e., of the exterior diameter) of the diffuser.

In one embodiment, the radius of curvature of the diffuser walls, in particular of the v-shaped blades, is between 30% and 200%, in particular between 80% and 120% of the outer diameter of the diffuser.

In a further embodiment, 15 to 30, in particular 17 to 25, quite in particular 20 v-shaped blades are arranged so as to be distributed at even angular distances on the base plate.

In another embodiment, intermediate blades can be arranged between the v-shaped blades.

In a further embodiment, an outflow into a combustion chamber occurs in the circumferential direction and in the movement direction of the radial compressor at an angle of twist of more than 0° and less than 40°, in particular at an angle of twist between 20° and 30°. At that, the angle is measured in the projection to the rotational axis. The flow at the diffuser exit is subject to swirls in the movement direction of the radial compressor.

The objective is also achieved by means of a radial compressor with the features as disclosed herein, and a turbomachine, in particular an aircraft engine, with the features as disclosed herein.

BRIEF DESCRIPTION OF THE DRAWINGS

The invention is explained is connection with the exemplary embodiments shown in the Figures.

DETAILED DESCRIPTION

Figure 1:
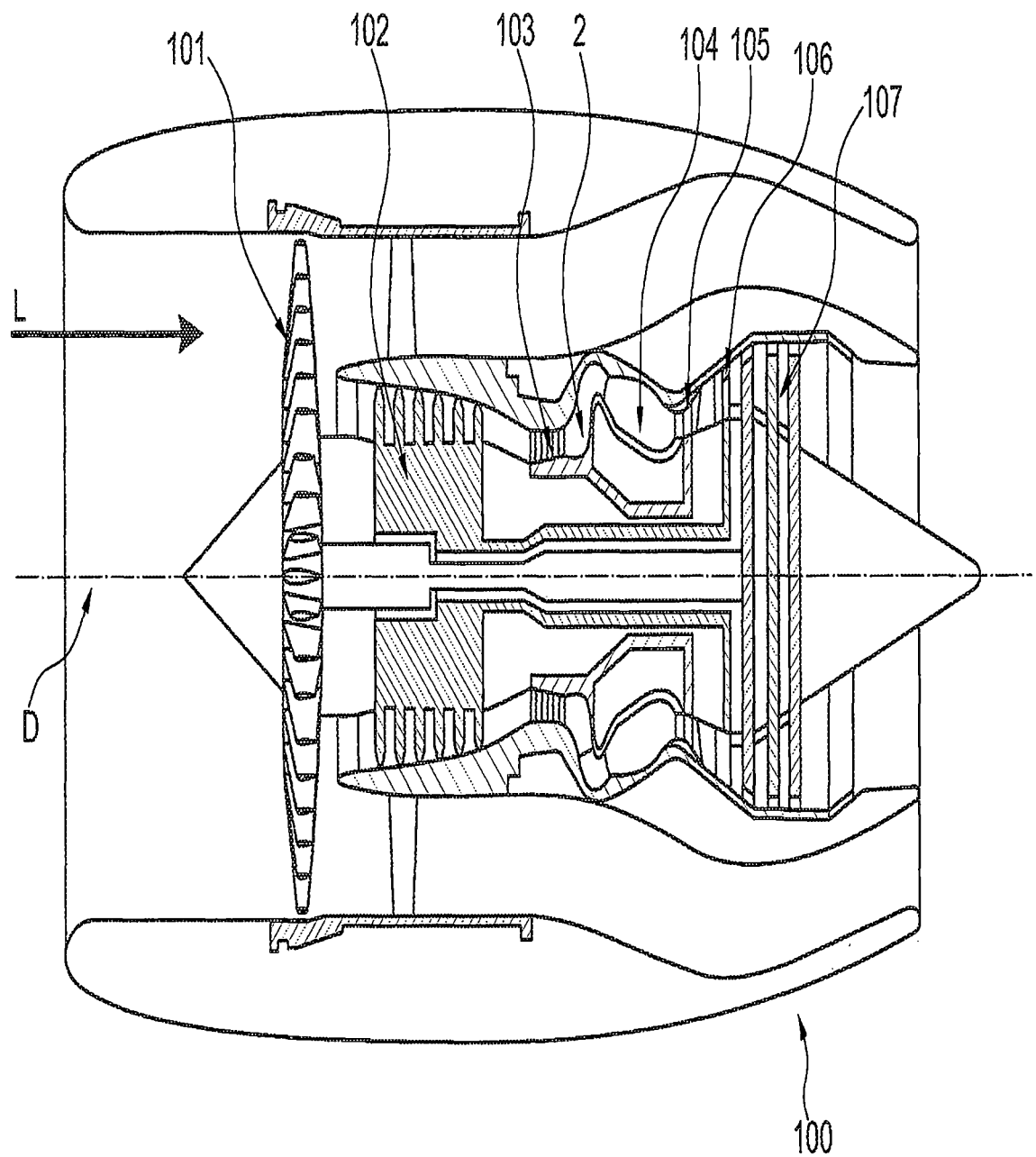
FIG. 1 shows a schematic rendering of an aircraft engine with a radial compressor.

FIG. 1 shows a schematic sectional view of a three-shaft aircraft engine 100 as turbomachine, wherein all shafts rotate around an engine axis D. At that, the entering air L is compressed by a low-pressure compressor 101 (also referred to as a fan). The portion of the air that is guided through the core engine, is subsequently compressed by a medium-pressure compressor 102 and a high-pressure compressor 103. In the shown embodiment, a radial compressor 2 is arranged so as to connect to the high-pressure compressor 103. The gases that are exiting from it are guided into a combustion chamber 104.

The strongly heated gases exiting from the combustion chamber 104 are subsequently depressurized by the high-pressure turbine 105, the medium-pressure turbine 106 and the low-pressure turbine 107. At that, the turbines 105, 106, 107 drive the compressors 101, 102, 103 in the known manner.

In alternative embodiments, the aircraft engine 100 can also have a lower number of shafts. Also, the design and arrangement of the radial compressor 2 may vary.

Figure 2:
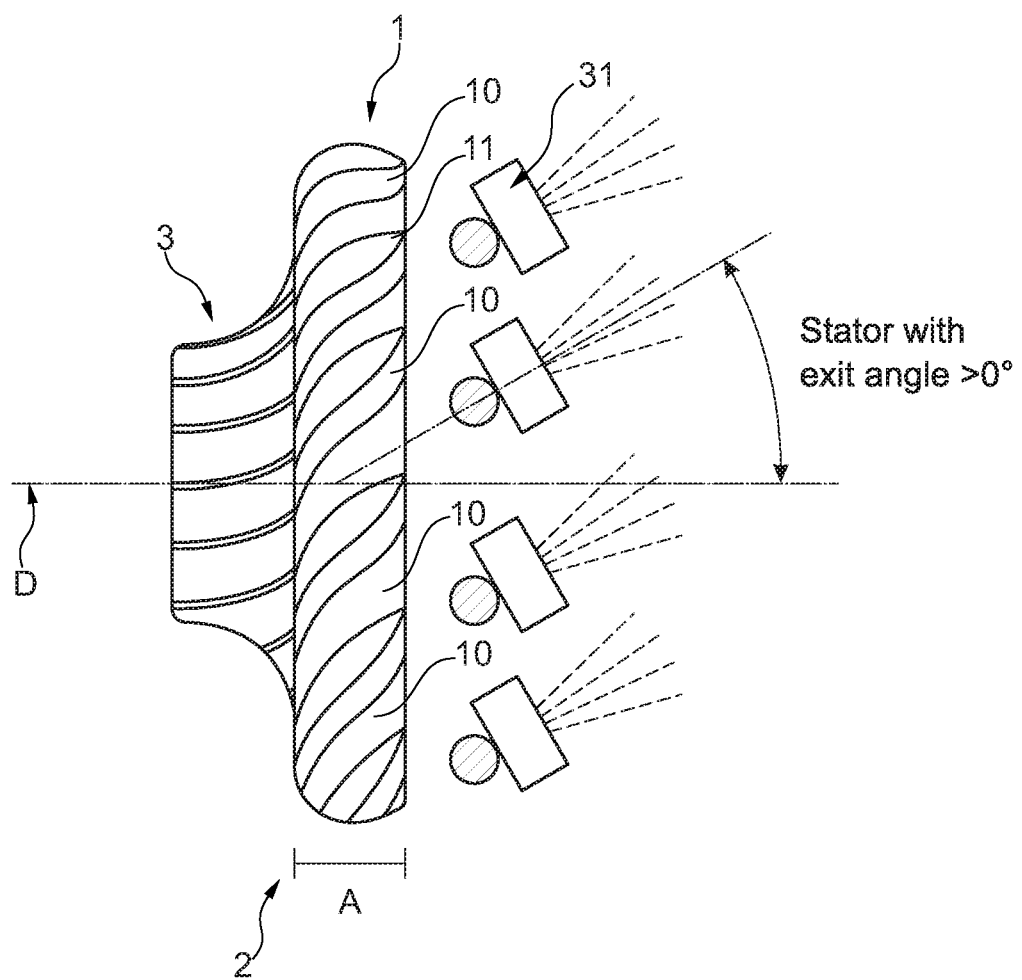
FIG. 2 shows a schematic lateral view of a radial compressor with a rotor, a stator and correspondingly aligned fuel nozzles for a burner.

The engine axis D is also the rotational axis of the radial compressor 2, which in FIG. 2 is shown in a lateral view. The radial compressor 2 has an impeller 3 and a diffuser 1. At the diffuser 1, diffuser channels 10 are arranged, through which the gases flowing out of the rotor 30 are guided.

The diffuser 1 has a radial area R (shown in FIG. 4) and an axial area A. The diffuser channels 10 in these areas R, A are bent in such a manner that the gas flowing inside the diffuser channels 10 has different flow components. The radial and axial area of the diffuser refers to the design of the diffuser, and not to the flow direction of the gas.

The diffuser channels 10 that extend in the radial direction (which cannot be seen in FIG. 2) and the axial direction (which can be seen in FIG. 2) are formed by v-shaped blades 11.

The diffuser channels 10 are inclined in the direction of the rotational axis D, so that the axial component of the outflowing gas also exits the diffuser 1 at this radially inwardly oriented angle. Arranged downstream are fuel nozzles 31 for the combustion chambers 104. At that, the arrangement of the fuel nozzles 31 is realized in such a manner that the spraying direction of the fuel is aligned with the exit angle of the gases.

Figure 3:
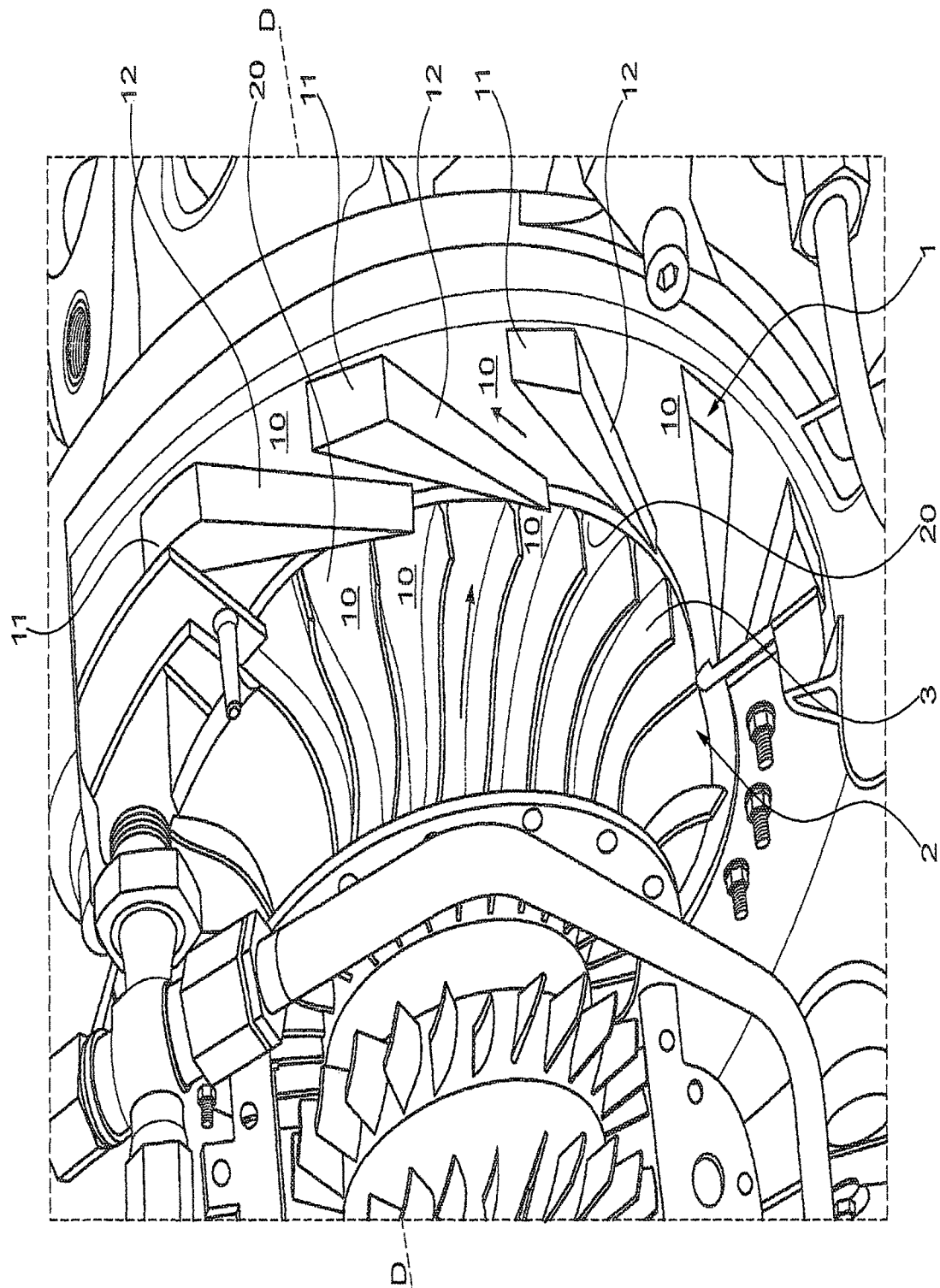
FIG. 3 shows a perspective view of a radial compressor according to the state of the art.

FIG. 3 shows a perspective view of a radial compressor 2 of a turbomachine, in the present case an aircraft engine, as it is known from the state of the art. The rotational axis D of the aircraft engine 100 is indicated by a dashed line.

The impeller 3 of the radial compressor 2 deflects the axially flowing gas—which in the present case comes from the left side—into a radial flow (represented by an arrow), wherein the impeller 3 provides for a considerable increase in flow velocity and of the static pressure (the degree of reaction being approximately 0.5). Then, the gas that is flowing out radially from the impeller 3 impinges on the diffuser 1 that surrounds the impeller 3 at the circumference in a ring-like manner. The diffuser 1 has a plurality of diffuser channels 10 that comprise diffuser walls 12 and a base plate 20. In this design, the diffuser walls 12 are arranged at v-shaped blades 11. Alternatively, the diffuser walls 12 can also be bent.

In the diffuser 1 that is known from the state of the art, the flow is guided radially outward as a continuation of the radial outflow from the impeller 3, and is decelerated in the process. The outflow from the diffuser 1 also occurs in the radial direction, i.e., the diffuser channels 10 do not change their direction in the flow direction of the gas.

Figure 4:
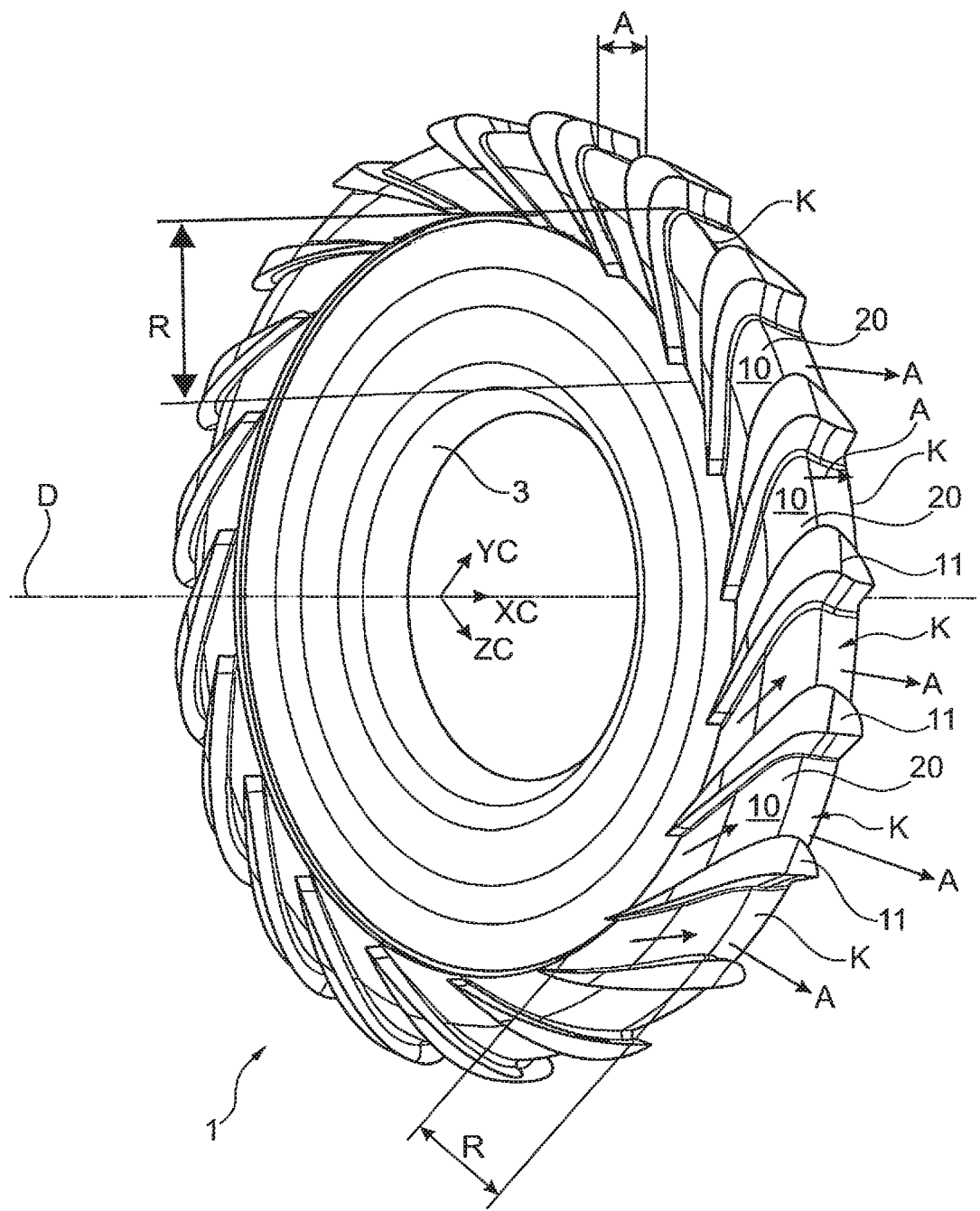
FIG. 4 shows a perspective rendering of an embodiment of a diffuser with a deflection from a radial direction to an axial direction at the exit.

FIG. 4 shows an embodiment of the diffuser 1 in which the diffuser channels 10 inside the diffuser 1 do change their direction in the flow direction. For reasons of clarity, the impeller 3 is not shown in any more detail in FIG. 4.

The diffuser 1 that is shown here has twenty diffuser channels 10, that are distributed across the base plate 20 at even angular distances. In other embodiments, between 15 and 30 diffuser channels 10 may be used, for example.

Here, the diffuser 1 has three areas that are passed by the flow in succession: a radial area R, a bent area K, and an axial area A. The diffuser channels 20 run through these three areas R, K, A in a continuous manner, i.e., the diffuser channels 20 extend continuously across the three areas R, K, A.

Here, the flowing gas enters the diffuser channels 10 from the impeller 3. In FIG. 4, the flow in the radial area R is indicated by an arrow in some places.

At the circumference of the diffuser 1, the radial area R transitions into a bent area K that deflects the flowing gas into the axial area direction A; i.e., the radial area R transitions into an axial area A.

Thus, this bent area K represents a means for deflecting the gas flow to the axial area A, so that the outflow from the diffuser 1 is not effected in the radially outward direction, as known from the state of the art.

What is known from the state of the art are diffusers with a radial and an axial part, which are connected by a bent area. However, these diffusers have separate blades in the radial and the axial area of the diffuser, and the bent area does not have any blades.

Due to the division of the diffuser channels 10 into a radial area R and an axial area A and continuous diffuser channels 10 from the radial area R across the bent area K into the axial area A, the radial installation space of the radial compressors 3 can be embodied to be smaller, without the flow path and thus the pressure build-up inside the gas flow being reduced.

The length of the diffuser channels 10 is determined on the one hand by the value by which the flow velocity of the gas is to be reduced, on the other hand by the opening angle of the diffuser 1. If this angle is chosen to be relatively large, flow separations may occur at the diffuser walls 12, which has a negative impact on the level of efficiency. If in contrast the opening angle is selected to be relatively small, this results in long diffuser channels 10 with corresponding frictional losses, which in turn also lead to a deterioration of the levels of efficiency. Therefore, a compromise always has to be made between the opening angle and the running length of the diffuser channels. Good results are for example achieved with an opening angle of approximately 14°, wherein here the angle is measured in the projection.

In the embodiment shown in FIG. 4, the diffuser channels 10 are respectively laterally delimited by diffuser walls 12, which in the present case are configured as straight walls or as walls with a very large radius of curvature at the v-shaped blades 11. However, the v-shaped blades 11—and thus also the diffuser walls 12—are guided around the bent area K (see for example also FIG. 5).

The bent area K can have an angle of curvature between 80° and 110°. Due to the fact that in the present case the angle of curvature is approximately 110°, the outflowing gas is guided in the direction of the rotational axis D, i.e., the flow is again guided in the direction of the turbomachine's interior.

The outflow in the circumferential direction and in the movement direction of the radial compressor occurs at an angle of twist of more than 0° and less than 40°, in particular at an angle of twist between 10° and 30°. This can be expedient for example for guiding the outflowing gas in a targeted manner into a combustion chamber, which is not shown here.

The radius of curvature of the bent area can have a circular contour or also an elliptical contour.

In FIG. 4, the length of the axial area A behind the bent area K is comparatively small with respect to the length of the radial area R in front of the bent area K. The ratio of the radial length to the axial length is approximately 3:1. In other embodiments, this length ratio can also be configured to be in the range of between 1:1 and 4:1.

Figure 5:
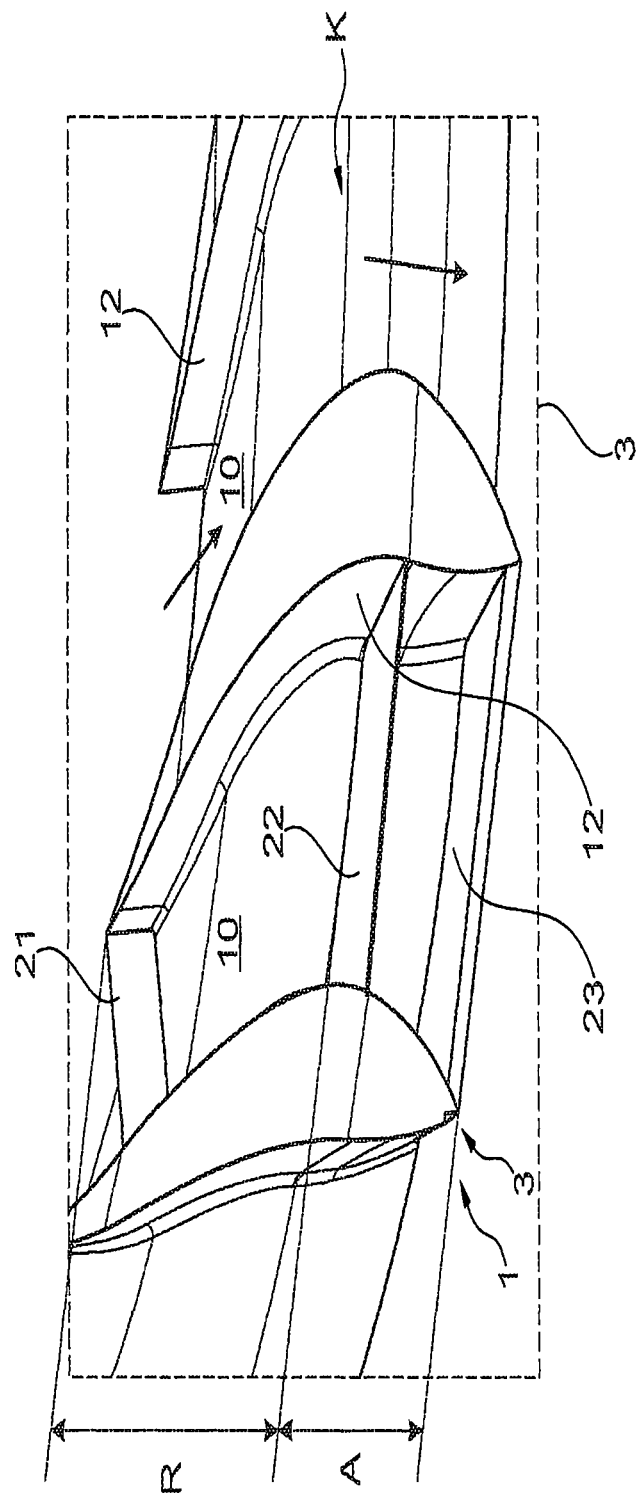
FIG. 5 shows a perspective rendering of a detail of an embodiment of a diffuser with an enlarged cross-sectional area.

FIG. 5 shows the outflow area of an embodiment of a diffuser 1 that substantially corresponds to the embodiment of FIG. 4. Therefore, the respective description may be referred to. The radial area R and the axial area A are also shown here.

Here, two diffuser channels 10 are shown in an enlarged manner, wherein the flow of the gas inside the right diffuser channel 10 is indicated by arrows. In the left diffuser channel 10, three cross-sectional areas 21, 22, 23 of the diffuser channel 10 are drawn in. The second cross-sectional area 22 is larger as compared to the upstream first cross-sectional area 21, so that a deceleration of the flow occurs in the area of the radial area R of the diffuser 1.

This deceleration is even increased in the axial area A of the diffuser 1 (that is, behind the bent area K) due to the fact that the v-shaped blades 11 are tapering off towards the outflow end. The cross-sectional areas of the diffuser channels 10 are thus enlarged again, whereby the pressure increase of the gas is increased. The third cross-sectional area 23 is considerably larger than the first or second cross-sectional areas 21, 22.

With such a design, the increase of the cross-sectional area of the diffuser channel 10 along the flow direction from the inflow opening to the outflow opening can be configured so as to be substantially linear. Another feature is the fact that the extensions of the cross-sectional surfaces can be realized within a wide range due to the mentioned parameters. Thus, diffusion may vary between 1:1 and 1:4, for example. It is also possible to realize linear or exponential progressions between these diffusion relationships.

The diffusion may also be different in the radial, bent and axial area R, K, A, for example the expansion in the bent area K can be only 50% to 100% of the expansion in the radial area R in order to avoid any separation at the diffuser walls of the bent areas. This can also be varied. It is expedient to slowly decelerate directly after the radial compressor.

Figure 6:
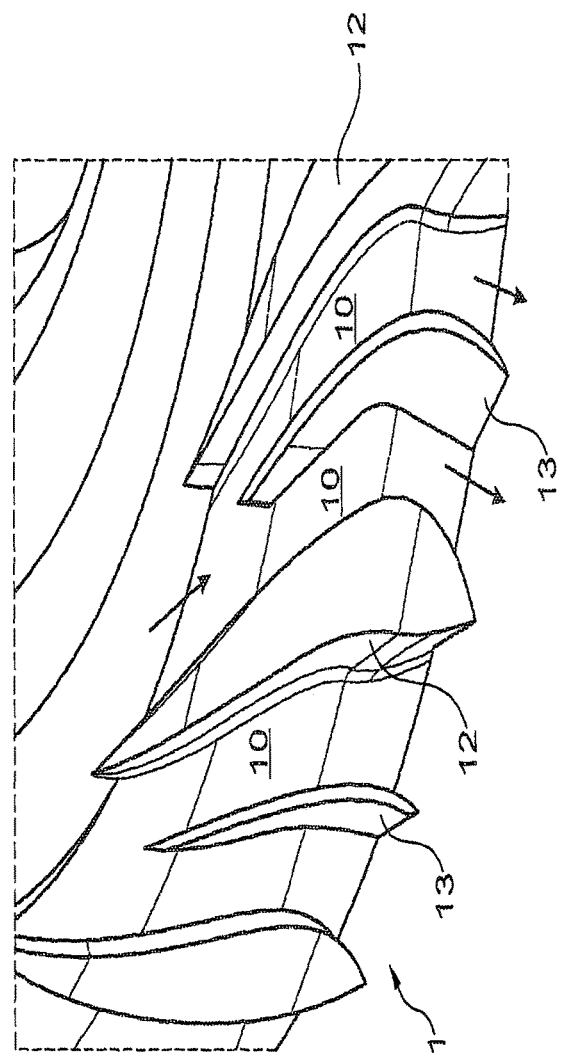
FIG. 6 shows a perspective rendering of an embodiment of a diffuser with an intermediate blade in the radial and the axial area of the diffuser channel.
Figure 7:
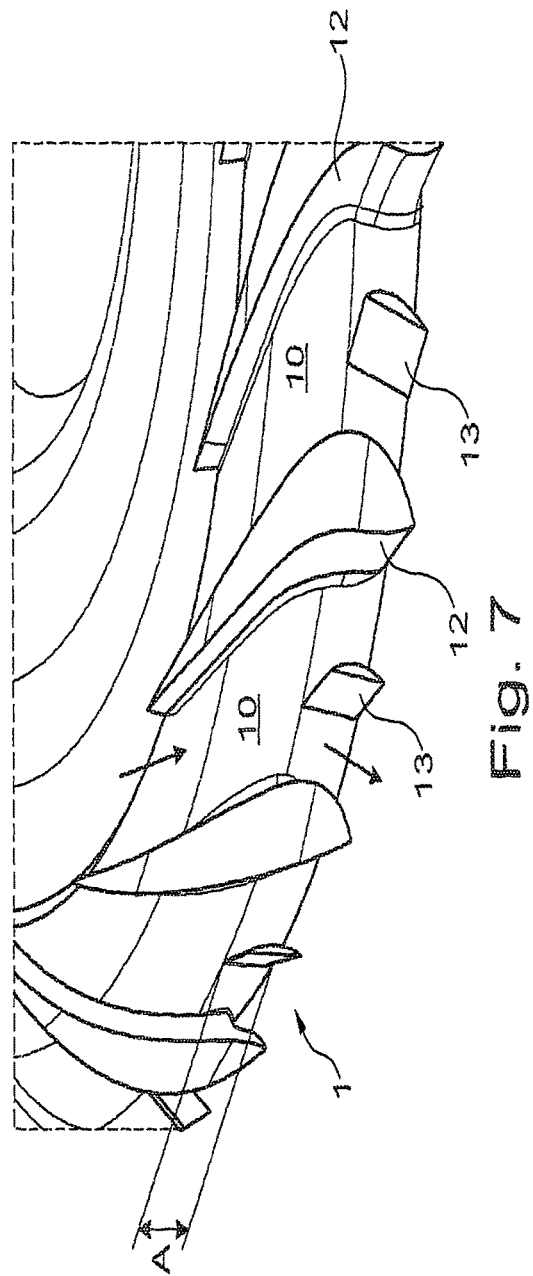
FIG. 7 shows a perspective rendering of an embodiment of a diffuser with an intermediate blade in the axial area of the diffuser channel.

FIGS. 6 and 7 show embodiments in which intermediate blades 13 are arranged inside the diffuser channels 10. Intermediate blades are useful if the inflow areas of the diffusers are relatively small with respect to the exit surface, and the expansion is to be achieved in a relatively short running length. Thus, they prevent the separation of the flow from the wall surfaces, but increase the wall friction. They also improve the axial deflection.

In the embodiment according to FIG. 6, the intermediate blades 13 begin at some distance behind the inflow opening of the diffuser channels 10 in the flow direction. The intermediate blades 13 are configured with thin walls of a constant wall thickness, but can also be configured as v-shaped blades, and extend from the radial area of the diffuser channel 19 around the bent area K and across the axial area of the diffuser channel 10 all the way to the outflow opening of the diffuser channel 10.

By contrast, in the embodiment of the diffuser 1 according to FIG. 7, the intermediate blades 13 are only arranged in the axial area A of the diffuser channel 10. Also, the intermediate blades 13 are configured so as to be contoured, i.e., the wall thickness is not constant. The shorter intermediate blades 13 serve for improving deflection. The longer intermediate blades also serve for separating the diffuser channel 10. In this way, two channels with a decreased deceleration are formed, and the flow is not separated. However, the wall friction is increased.

In the following Figures, some geometric dimensions of the diffuser 1 are disclosed in more detail.

Figure 8:
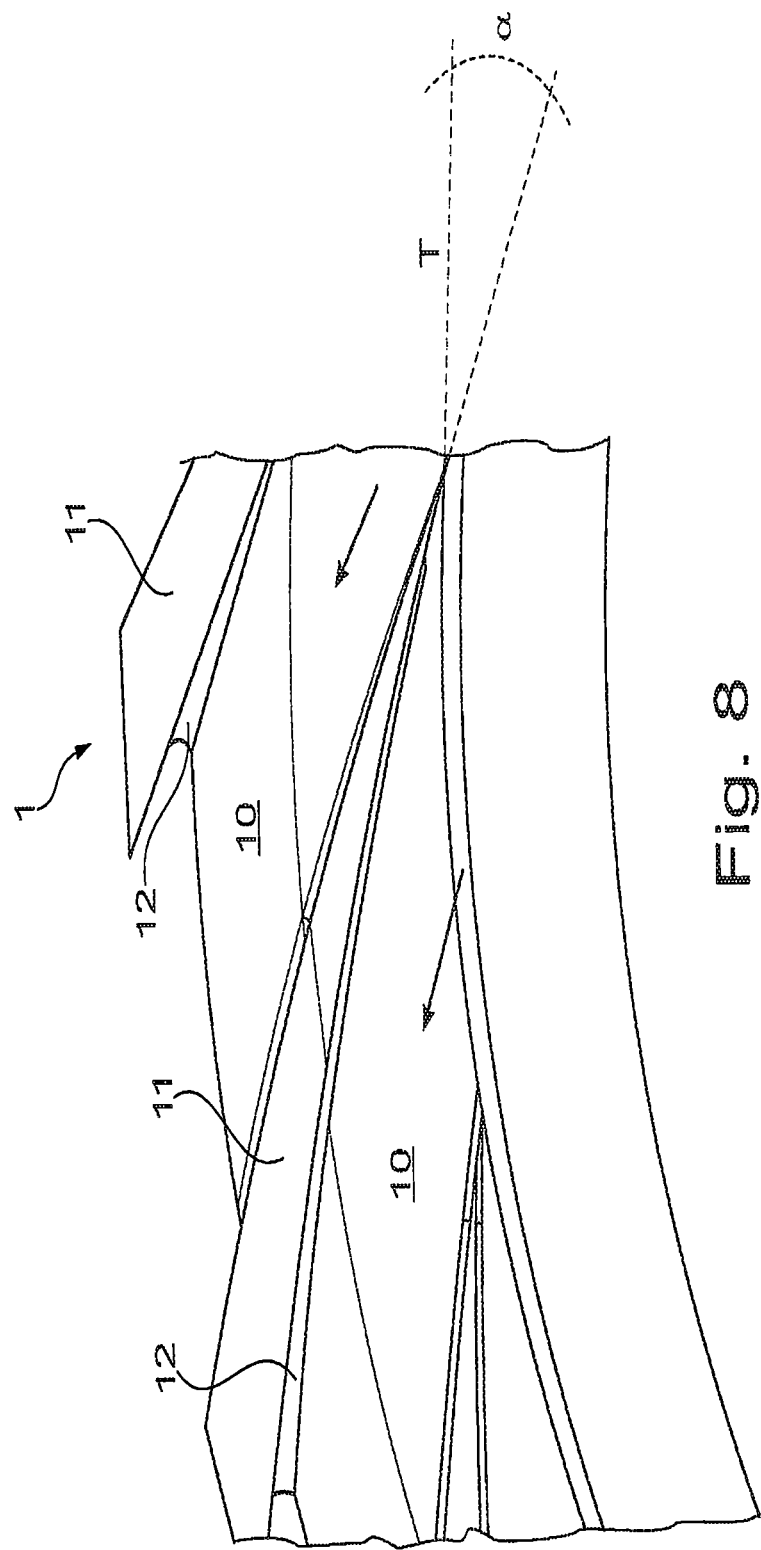
FIG. 8 shows a schematic rendering of the entrance angle of an embodiment of a v-shaped blade.

FIG. 8 schematically shows an inflow area of the diffuser 1, which in the present case comprises v-shaped blades 11. The v-shaped blades 11 are inclined by the angle $\alpha$ with respect to a tangent T of the impeller 3. The angle $\alpha$ can be between 15° and 30°, for example. In the present case, the diffuser walls 12 at the v-shaped blades 11 are configured so as to be bent with a radius of curvature r.

Figure 9:
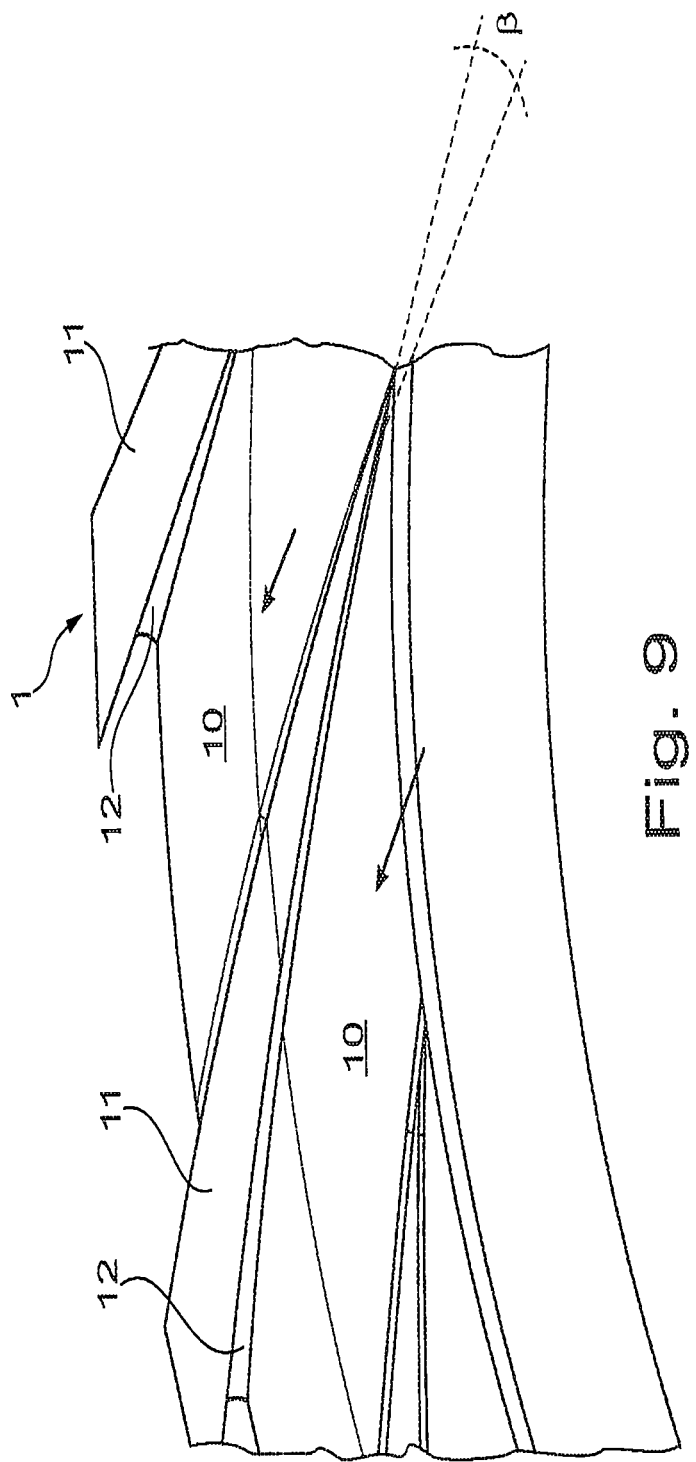
FIG. 9 shows a schematic rendering of the angle of an embodiment of a v-shaped blade.

FIG. 9 substantially shows the same section as FIG. 8. As is shown here, the angle $\beta$ of the v-shaped blades 11 is between 4° and 15° at the inner circumference of the diffuser 1.

The entrance angle α is defined by way of the impeller 3. Here, a certain running distance is necessary in the radial direction until the flow can be axially deflected. While the running distance remains constant due to the v-shaped blades 11 being bent in the circumferential direction, the diameter of the diffuser 1 is decreased. However, so is the blade thickness, which results from the angle β. In straight v-shaped blades, β is relatively large, as otherwise the diffusion becomes too great, and the radial installation space becomes too large, as well. In wedges bent around the circumferential direction, β is decreased, so that diffusion is not rendered too low, and the radial installation space becomes smaller.

Figure 10:
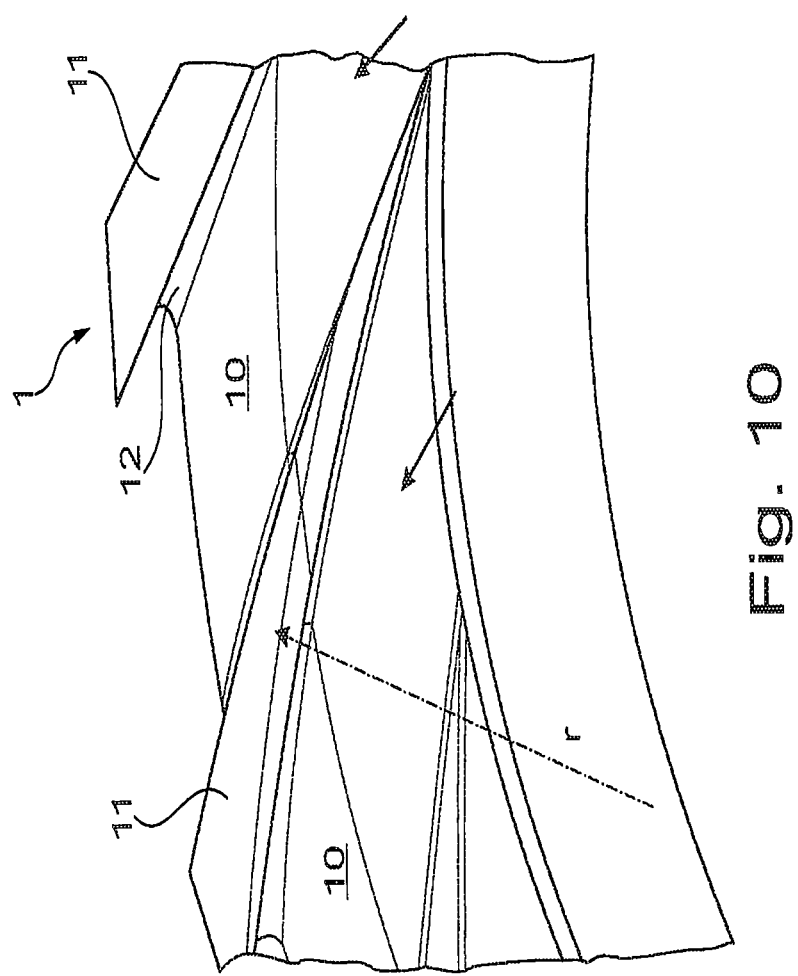
FIG. 10 shows a schematic rendering of a radius of curvature of an embodiment of a v-shaped blade.

FIG. 10 also shows substantially the same section as FIGS. 8 and 9. The radius of curvature r of a v-shaped blade 11 can be between 30% and 200% of the outer diameter of the diffuser. Here, the radius of curvature r is determined in view direction towards the diffuser 1, wherein the central point of the radius of curvature r is located on the rotational axis D.

However, the v-shaped blades 11 may also be configured in a straight manner.

Figure 11:
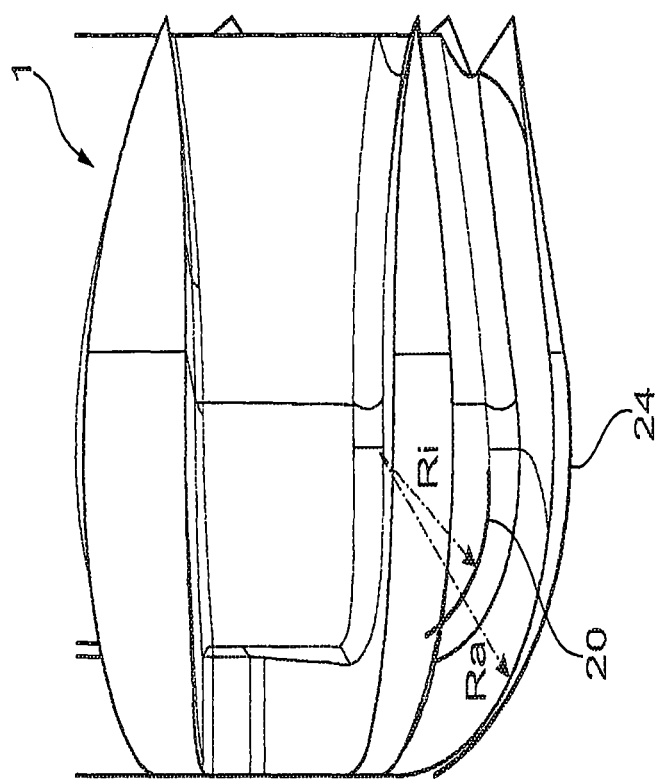
FIG. 11 shows a schematic exterior view of an embodiment of a diffuser for the rendering of radii of curvature.

FIG. 11 shows an exterior view of an embodiment of a diffuser 1. The radius of curvature Ri of the base plate corresponds to 5% to 50% of the radial installation length of the diffuser 1. The radius of curvature Ra of the cover of the diffuser channels 10 is in the range of 5% to 60% of the radial installation length of the diffuser 1.

Figure 12:
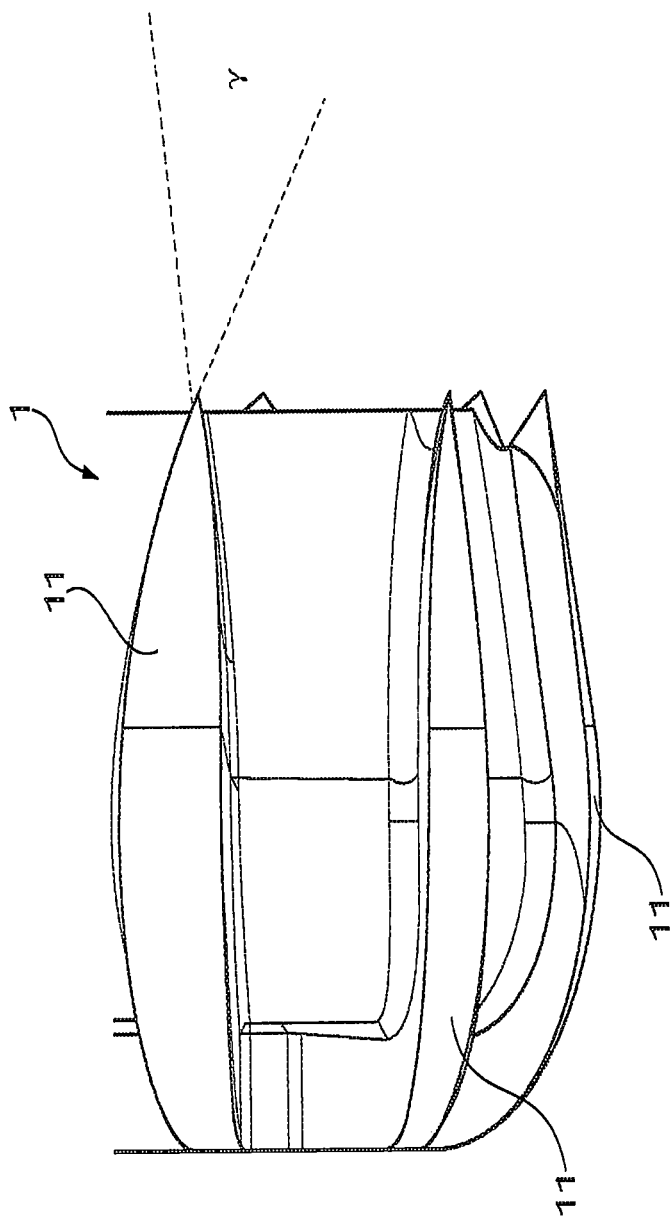
FIG. 12 shows a schematic exterior view of an embodiment of a diffuser for the rendering of a tapering angle at the exit of the diffuser.

FIG. 12 shows substantially the same view as FIG. 11, wherein in particular the tapering angle γ is shown. It can be between 8° and 60°.

Figure 13:
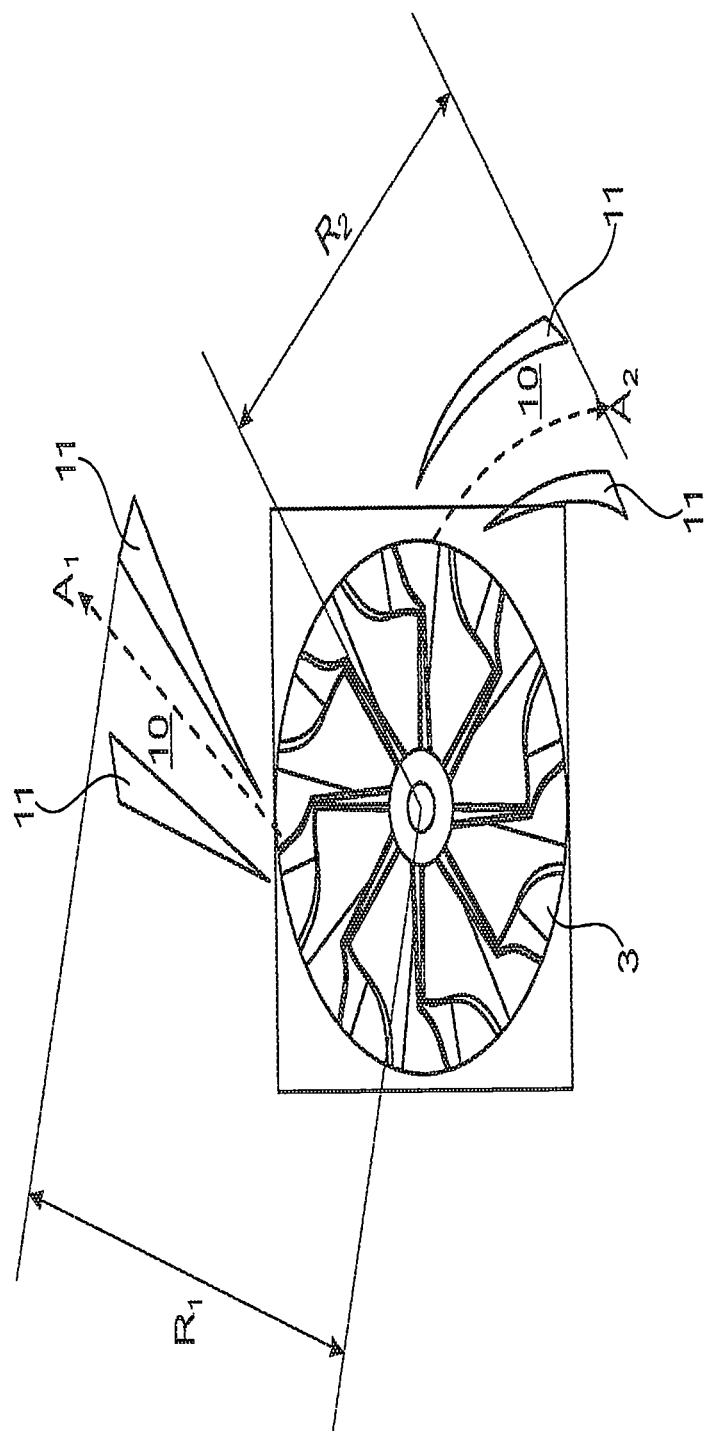
FIG. 13 shows a schematic diagram for clarifying the reduction of the installation spaces through v-shaped blades that are bent in the circumferential direction.

FIG. 13 shows in a schematic diagram what kind of effect is created by using blade wedges that are bent in the circumferential direction.

A diffuser 3 is shown in an axial view here. The use of straight v-shaped blades 11, i.e., v-shaped blades 11 that have substantially straight walls in the part that is shown here, requires a radius $R_1$ to the outer edge as measured from the rotational axis D. The cross-sectional area is defined as $A_1$ here.

If v-shaped blades 11 that are bent in the circumferential direction are used, with the cross-sectional area $A_2$ being the same, the radius $R_2$ to the outer edge is smaller, i.e., the radial installation space is smaller, with the running length of the gas being constant in the radial plane.

PARTS LIST 1 diffuser
2 radial compressor
3 impeller
10 diffuser channel
11 v-shaped blade
12 diffuser wall of a v-shaped blade of a diffuser channel
13 intermediate blades
20 base plate
21 first cross-sectional area of the diffuser channel
22 second cross-sectional area of the diffuser channel
23 third cross-sectional area of the diffuser channel
24 cover of the diffuser channel
30 rotor of a radial compressor
31 fuel nozzle
100 aircraft engine
101 low-pressure compressor (fan)
102 medium-pressure compressor
103 high-pressure compressor
104 combustion chamber
105 high-pressure turbine
106 medium-pressure turbine
107 low-pressure turbine
A axial area of the diffuser channel
D rotational axis of the radial compressor
K bent area of the diffuser channel
L airflow inside the aircraft engine
r radius of curvature of the v-shaped blade
Ri radius of curvature of the base plate
Ra radius of curvature of the cover of the diffuser channel
R radial area of the diffuser channel
T tangent at the pipe
α entrance angle
β angle of the v-shaped blade
γ tapering angle

The invention claimed is:

1. A diffuser for a radial compressor of a turbomachine, comprising:
a radial area with respect to a rotational axis of the radial compressor;
an axial area with respect to the rotational axis;
a bent area between the radial area and the axial area;
a plurality of v-shaped blades distributed around a circumference of an impeller of the radial compressor, each v-shaped blade including:
two sides, with a diffuser wall on each of the two sides: and
a v-shaped portion between the two sides in the radial area;
a diffuser channel between adjacent v-shaped blades of the plurality of v-shaped blades, wherein the diffuser channel extends across the radial area, across the bent area and into the axial area, and wherein the diffuser channel is one chosen from bent in a circumferential direction of the radial compressor and straight; and
an intermediate blade arranged inside the diffuser channel and extending across the radial area, across the bent area, and into the axial area, wherein the intermediate blade includes an intermediate radial portion in the radial area, and wherein a radial length of the intermediate radial portion is less than a radial length of the v-shaped blade radial portion.

2. The diffuser according to claim 1, wherein the diffuser channel is laterally delimited by the diffuser walls of the adjacent v-shaped blades that continuously extend from the radial area across the bent area and into the axial area.

3. The diffuser according to claim 2, wherein the diffuser includes at least one chosen from a base plate and a cover, and wherein the diffuser walls are arranged at the at least one chosen from the base plate and the cover.

4. The diffuser according to claim 3, wherein, in the bent area, the cover includes a radius of curvature of 5% to 120% of a radial length of the diffuser.

5. The diffuser according to claim 2, wherein the diffuser channel includes a cross-sectional area perpendicular to a flow direction, wherein a downstream cross-sectional area that is located downstream of the flow direction is larger than an upstream a cross-sectional area that is located upstream.

6. The diffuser according to claim 5, wherein the downstream cross-sectional area is formed in the axial area by areas of the diffusor walls that taper off in the flow direction at a tapering angle, and wherein the tapering angle is between 8° and 60°.

7. The diffuser according to claim 5, wherein a ratio of the cross-sectional area in a radial entry area of the diffuser channel to the cross-sectional area in an axial exit area is between 1:1.2 and 1:4.

8. The diffuser according to claim 2, wherein a radius of curvature of the diffuser walls is between 30% and 200% of an outer diameter of the diffuser.

9. The diffuser according to claim 1, wherein the bent area has one chosen from a circular and an elliptical contour.

10. The diffuser according to claim 1, wherein the diffuser channel includes a plurality of flow paths, and wherein a length ratio of each at the plurality of flow paths in the diffuser channel in the radial area to each of the plurality of flow paths in the diffuser channel in the axial area is between 1:1 and 4:1.

11. The diffuser according to claim 1, wherein the diffuser channel includes a diffuser exit and an wherein the diffuser channel inclines in an area of the diffuser exit at an angle of up to 30° in an axial direction with respect to the rotational axis of the radial compressor.

12. The diffuser according to claim 1, wherein the turbomachine includes at least one chosen from a combustion chamber and a fuel nozzle, and wherein a gas exiting the diffuser is guided in a direction of the at least one chosen from the combustion chamber and the fuel nozzle.

13. The diffuser according to claim 1, further comprising an impeller and an entrance angle of the diffuser channel is between 15° and 30°, wherein the entrance angle is measured from a tangent of the impeller.

14. The diffuser according to claim 1, wherein a blade thickness of the plurality of v-shaped blades increases along an angle between 4° and 15° at an inner circumference of the diffuser.

15. The diffuser according to claim 1, including a base plate, wherein, in the bent area, the base plate includes a radius of curvature between 5% and 50% of a radial length of the diffuser.

16. The diffuser according to claim 1, further comprising a base plate, wherein the plurality of v-shaped blades is in a range of 15-30 v-shaped blades arranged on the base plate so as to be distributed at even angular distances.

17. The diffuser according to claim 1, wherein the turbomachine further comprises a combustion chamber, and wherein the diffuser includes an outflow into the combustion chamber in the circumferential direction with respect to the rotational axis and the circumferential direction of the radial compressor has an angle of twist of more than 0° and less than 40°.

18. A radial compressor with the diffuser according to claim 1.

19. A turbomachine with the diffuser according to claim 1.

* * * * *